US008804894B2

(12) United States Patent
Rio

(10) Patent No.: US 8,804,894 B2
(45) Date of Patent: Aug. 12, 2014

(54) METHOD OF PRODUCING MIXED IN-CORE MAPS AND APPLICATION TO THE CALIBRATION OF FIXED INSTRUMENTATION

(75) Inventor: Gérard Rio, Saint Germain en Laye (FR)

(73) Assignee: Areva NP, Courbevoie (FR)

( * ) Notice: Subject to any disclaimer, the term of this patent is extended or adjusted under 35 U.S.C. 154(b) by 1065 days.

(21) Appl. No.: 12/682,675

(22) PCT Filed: Oct. 9, 2008

(86) PCT No.: PCT/FR2008/051834
§ 371 (c)(1),
(2), (4) Date: Aug. 12, 2010

(87) PCT Pub. No.: WO2009/053624
PCT Pub. Date: Apr. 30, 2009

(65) Prior Publication Data
US 2010/0303190 A1 Dec. 2, 2010

(30) Foreign Application Priority Data
Oct. 12, 2007 (FR) .................................. 07 58301

(51) Int. Cl.
*G21C 17/00* (2006.01)
(52) U.S. Cl.
USPC ........................................................ 376/255
(58) Field of Classification Search
USPC ........................................................ 376/255
See application file for complete search history.

(56) References Cited

U.S. PATENT DOCUMENTS

| 4,268,354 | A | 5/1981 | Wassel | |
| 6,430,247 | B1 * | 8/2002 | Mourlevat et al. | 376/254 |
| 2001/0026603 | A1 * | 10/2001 | Hirukawa et al. | 376/255 |
| 2002/0195569 | A1 * | 12/2002 | Seidel et al. | 250/391 |

FOREIGN PATENT DOCUMENTS

| EP | 0 323 280 | 7/1989 |
| EP | 0 396 321 | 4/1990 |
| EP | 1 197 970 | 4/2002 |
| FR | 2 438 895 | 5/1980 |

OTHER PUBLICATIONS

International Serach Report, issued Jun. 18, 2009 for PCT International Application No. PCT/FR2008/051834.

* cited by examiner

*Primary Examiner* — Timothy A Brainard
(74) *Attorney, Agent, or Firm* — Pearl Cohen Zedek Latzer Baratz LLP

(57) ABSTRACT

The object of the present invention is a method for establishing so-called "mixed IN-CORE mappings". Its essential purpose is to compensate a loss of density of a reference instrumentation, called "RIC instrumentation" (or "RIC system"), when a significant number of locations, initially used by the sensors of the RIC system, are occupied by fixed collectron-type rods. An obvious physical interest lies in the increase of the measurement density, and thus of the level of confidence, associated with the operating results deduced from the processing of these measurements. One application of the method according to the invention concerns a collectron-type detector calibration method placed inside a nuclear reactor core.

18 Claims, 2 Drawing Sheets

METHOD OF PRODUCING MIXED IN-CORE MAPS AND APPLICATION TO THE CALIBRATION OF FIXED INSTRUMENTATION

CROSS-REFERENCE TO RELATED APPLICATIONS

This application is a National Phase Application of PCT International Patent Application No. PCT/FR2008/051834, International Filing Date Oct. 9, 2008, which claims priority from French Patent Application, 0758301 filed Oct. 12, 2007, both of which are incorporated by reference herein.

FIELD OF THE INVENTION

The invention concerns a method for establishing so-called "mixed IN-CORE mappings". The present invention also refers to an application of said method to the calibration of fixed-type instrumentation. IN-CORE mappings are mappings illustrating a power distribution inside nuclear reactors, established by means of sensors that are placed, in either a fixed or mobile manner, either temporarily or permanently, inside the reactor core. Its essential purpose is to compensate a loss of density of a reference instrumentation, called "RIC instrumentation" (or "RIC system"), when a significant number of locations, initially used by the sensors of the RIC system, are occupied by fixed collectron-type rods. An obvious physical interest lies in the increase of the measurement density, and thus in the level of confidence associated with the operating results deduced from the processing of these measurements, The present document shall refer to a series of abbreviations or expressions, notably within the different equations and relations, a glossary of which being stated below:

C/M: Calculation/Measurement gap $\mu_U^N$: uncertainty associated with the calculation of the distribution of local pencil power inside an assembly $R_{U1}^N$: uncertainty associated with the transposition of the C/M gaps on an "activity" type parameter over to a "power" type parameter $R_{U2}^N$: uncertainty associated with the spatial propagation of the C/M gaps $M_U^N$: uncertainty associated with the measurement system (detector and acquisition)

$E_U^N$: standard overall uncertainty on the power reconstruction process

C/PM: Calculation/Pseudo Measurement gap $R_{U2p}^N$: generalised extension uncertainty of the C/PM gaps $E_{Up}^N$: overall uncertainty, according to the RUN2p methodology, on the power reconstruction process SchX: any X-type instrumentation diagram REF: reference instrumentation diagram S(t): detector sensitivity upon completion of an irradiation t-time S(0): initial sensitivity of a new detector Q(t): integration of the current delivered by a detector upon completion of an irradiation t-time $Q_\infty$: initial load available for a new detector a: exponent of the experimental law of wear A1 and A2: distributions of activities associated with type 1 and type 2 detectors, respectively N1 and N2: number of acquisitions for type 1 and type 2 detectors, respectively $A_1^{MES}$ and $A_2^{MES}$: distributions of activities measured by type 1 and 2 detectors, respectively $A_1^{CAL}$ and $A_2^{CAL}$: distributions of equivalent activities calculated for type 1 and type 2 detectors, respectively $A_{1 \leftarrow 2}^{CONV}$: conversion of an activity witnessed by a type 2 detector into an activity that would be witnessed by a type 1 detector brut: normally refers to a distribution whose elements have not undergone any normalization process relatif: refers to a distribution whose elements are linked by a normalization of series g: coefficient reporting the normalization differences between two distributions complet: characterises a distribution for which all the elements are used $\sigma(T_U^N)$ and $T_U^N$: standard gap and uncertainty associated with the process for constructing a mixed mapping.

$\sigma(A_U^N)$ and $A_U^N$: standard gap and uncertainty associated with the calculation of the A activities r: linear correlation coefficient conversion: refers to the action for transforming an acquisition of a given type detector into an acquisition that could have been obtained at the same time and in the same place by a detector of another type.

$A_{COL}^{BRUT}$: gross activity, for XYZ 3D position, deduced from the acquisitions of a type 2 detector (here, COL).

$A_{PRIC}^{BRUT}$: gross activity, for XYZ 3D position, initially of type 2 and converted into type 1 activities (here, PRIC).

$A_{RIC}^{EST}$: estimated activity, for XYZ 3D position, of type 1 (here, RIC).

FCOR: 3D calibration or correction factor.

$A_{COL}^{COR}$: corrected activity, for XYZ 3D position, of type 2 (here, COL).

$A_{PRIC}^{COR}$: corrected activity, for XYZ position, of type 1 after conversion (here, PRIC).

$C_U^N$: uncertainty associated with the calibration process of a detector 2 based on the simultaneous acquisitions of a detector 1.

The field of the invention is, generally-speaking, that of nuclear reactors. Nuclear reactors, such as pressurized water-cooled nuclear reactors, comprise a core constituted of fuel assemblies, each assembly being comprised of a plurality of fuel pencils, notably of uranium slightly enriched with isotope 235; the assemblies are placed vertically in juxtaposition with their longitudinal axes, i.e. by following the height of the core.

As a general rule hereinafter, the longitudinal axes are thus identified as z-elevation, x-abscissae and y-coordinates, enabling determination of a nuclear reactor point within a horizontal plane. Hence, a nuclear reactor core can be considered as cut into sections, or axial grid cells, of a certain thickness, identified by the z-elevation; a nuclear reactor point is further identified by its azimuthal position, based on an angle defined in a horizontal plane, in relation to the z-axis of the orthogonal three-dimensional (x,y,z) markers, and by its radial position, defined by a distance, within a horizontal plane, between the point considered and the axis of the markers.

The power released by the assemblies, power directly correlated with the neutron flux generated by the fuel present in said assemblies, is not uniformly distributed inside the volume of the reactor. There are areas where power is higher than in other areas, typically in the centre of the reactor when compared with the periphery. Hot spots are then referred to; in the region of these spots, in fact, the power supplied almost attains the design limits of the nuclear reactor core. Consequently, the power distribution inside a nuclear reactor core lacks consistency; the embodiment of a complete power mapping inside the core, referred to as 3D power distribution—a fundamental operation for obvious safety reasons, is thus a complex operation.

Hence, the operating and securing of nuclear reactors requires determination of the energy supplied by the uranium 235 nuclei fissions, i.e. the nuclear power, in each spot of the nuclear reactor. For this purpose, measurements are performed in order to evaluate the power in the various spots of the nuclear core. In all cases, evaluation of such power involves measuring the radiation emitted by the reactor core, and more particularly the neutron flux.

Measurement of a neutron flux is always achieved by way of a neutron/matter interaction, which in turn creates particles liable to produce a measurable electric current. After each neutron absorption, the atoms of the sensitive matter constituting the sensor will be transformed; the sensitive matter as such will thus gradually disappear. Such disappearance is performed at a speed that depends upon the intensity of the neutron flux and upon the probability of a reactive occurrence, itself directly linked to the cross-section absorption. The higher this probability and the stronger the current supplied, the faster on other hand the sensitive matter disappears, thereby requiring replacement of the sensor at very short intervals.

Depletion of the sensitive matter thus becomes a crucial problem for a neutron sensor permanently located inside the core.

In order to resolve this sensitive depletion problem for the sensors, many nuclear reactor manufacturers have chosen not to leave the sensors in a static measurement position inside the core and thus to dispatch them throughout the reactor for the sole purpose of taking intermittent readings. The term "mobile internal instrumentation" thus refers to traditionally-used sensors, which, hereinafter, shall be referred to as "RIC system" (Core Instrumentation Reactor). Other systems, for example the aeroball system, may also be considered as a mobile internal reference instrumentation system The function of the RIC system is to precisely measure the flux distribution inside the reactor core, with relatively minor constraints in terms of response time. In practice, therefore, the RIC system coexists with a control system called "NPR system" (nuclear protection reactor), placed outside the nuclear reactor core and responsible for measuring a few parameters of the power distribution (such as axial and azimuthal imbalance) and the power level with an excellent response time, though not quite as precise as the RIC system measurements. The NPR system is periodically calibrated, since the proportionality between the external measurement and the reactor's real power level depends upon the radial component of the power distribution, which itself varies as the fuel depletes. The data provided by the RIC system may be used to perform such calibration.

In a more general manner, the RIC system is used in two separate situations:

First of all, during the start-up test periods, after each assembly reloading, or during special test periods, the RIC system is used for:

verifying that the power distribution at the start of a cycle complies with the design calculations and, in particular, that the value of the hot spots is in accordance with the design assumptions;

calibrating the NPR system detectors;

detecting a possible loading error;

supplying data on the distribution of flux that are involved in the qualification of IT codes and of the methods used in the design calculations of the reactor core.

Then, during a cycle and under normal operation, the RIC system is notably used for:

verifying that the power distribution and, in particular, the hot spot factors, evolve according to time, such as provided in the design calculations;

verifying and/or calibrating the NPR system detectors.

In terms of precision, a compromise has been chosen in the past between the desire of wanting to measure the power in a vast number of assemblies, and a material reality residing in the fact that it is necessary to drill, for each instrumented position, a hole in the base of the nuclear reactor tank. Such compromise results in the penalising fact that a limited number of instrumented assemblies have been chosen—an economically and technologically advantageous solution, though consequently limiting the precision of the flux distribution measurement and necessitating the existence of certain leeway, provided by a subsequently detailed uncertainty calculation, having the purpose of compensating imperfect experimental knowledge of the 3D power distribution, notably in the region of the hot spots.

In practice, six mobile neutron detectors are used. The mobile detectors are of the fission chamber type. This type of neutron sensor consists of a standard ionisation chamber and uses uranium as neutron-sensitive matter. The current supplied by the mobile detectors is proportional to the fission reaction rate in the detector and not directly to the power: activity rather than power is thus more often readily referred to; a phase for transposing the activity measurements into a power determination is subsequently introduced during analysis of the performed measurements. Such transposition gives rise to a particular uncertainty component, noted as $R_{U1}^N$.

The mobile detectors are dispatched, via a switching device, into impervious tubes, called glove fingers, placed in an instrumentation tube of 60 fuel assemblies selected for the purpose. The selected fuel assemblies are called instrumented assemblies. Hence, each detector is designed to explore ten assemblies. In order to ensure the transfer of detectors from one assembly to another, mechanisms trigger off group selectors.

It can be stated at this point that the acquisition process comprises one or several extra so-called inter-calibration passes.

Indeed, the quantity of sensitive matter prone to interaction with the neutrons lessens as irradiation of the detector, or, to be more precise, of the particle fluence received by the latter, extends over time. The sensitivity, i.e. the ratio between the current emitted and the flux witnessed by the detector, will evolve over time: correction is thus necessary in the analysis stage in order to take account of such variation. Each mobile probe will evolve independently one from the other, since it receives its own particular fluence depending on the power of the assemblies that it explores. The function of the intercalibration passes is thus to allow the measurement of the relative sensitivities. Determination of the sensitivities should be performed before each complete flux map and is compulsory. Hence, calibration of the detectors is an operation which consists of acting on the electrical gain of the measurement chain, in order to compensate the reduction in current supplied by the sensor due to the depletion, and to maintain constant the indicated value. This operation also enables to correct the differences between detectors possibly occurring due to the fact that each of them has its own electronic acquisition system. In practice, it is performed in the following manner:

All group selectors are directed towards a so-called "standby position", which enables each of the probes to go and explore the assemblies normally measured by the probe located just above (except for probe 6 which, by circular permutation, goes and explores the assemblies normally allocated to probe 1). It is thus possible to compare the measurements obtained during the intercalibration passes for the purpose of determining the relative sensitivities of the probes, and to take account thereof during analysis of the measurements.

The results of the measurement analysis by the mobile internal instrumentation system during examination of the 60 assemblies selected for the purpose, i.e. a partial distribution of the reaction rate in three dimensions across the core determined by the performed measurements, are referred to as the flux map.

Hence, although measuring the flux distribution in a significant number of fuel assemblies—approximately 30% of the assemblies are instrumented—the RIC system does not radially cover the whole core. If the hot spot factor is located in a non-instrumented assembly, it fails to be measured. It is thus necessary to supplement the information supplied by the mobile detectors. Additional information is provided by theoretical calculation. The establishment of a 3D power distribution for a nuclear reactor core, detailed hereunder, thus always requires a combination of experimental data and calculated data.

Instrumentation systems, other than the RIC, may equip industrial reactors. For example, the Aeroball system may be quoted here, which is an instrumentation system that brings into play mobile parts constituted of steel ball batches containing 1.5% of a sensitive isotope, such as Vanadium, and which circulate, driven by compressed nitrogen, inside pipes, and which penetrate into the tank through the cover. The neutron flux measurement depends on activation of the balls when the latter are placed under a neutron flux; the evaluation of their activity is performed by means of fixed detectors placed on racks located outside the tank, but inside the reactor construction. The collectron-type system may also be quoted, an electron-collecting system, which complies with the following physical principles: placed in a neutron flux, a body is able to emit electrons. The originality of a collectron lies in the fact that, under extremely reduced dimensions, the current supplied is quite high and that the electrons emitted are collected and measured in a continuous process without external polarisation tension. The collectrons, at the heart of the present invention, will be subsequently detailed hereunder.

As a general rule, the data resulting from the power distribution calculation, a theoretical calculation, correspond to a power distribution calculated on the basis of a model that reproduces the operating conditions observed during embodiment of the flux map. This calculation is made in R&D bureaux during the planning stages. It observes the following principles:

The signal resulting from the measurement by the fission detectors is proportional to a fission rate in the sensitive part of the detector, i.e. to the result produced between the fission and the flux cross-section. It is thus necessary to calculate the fission cross-section in order to be able to access the detector's activation rate. The theoretical models used explicitly represent the glove finger and the instrumentation tube in order to best approach the exact conditions of the measurement. The fission cross-section is calculated by taking account of the local conditions around the instrumentation tube and by explicitly representing the glove finger and the instrumentation tube for the calculation of the flux. This calculation is made for each instrumented assembly by a cell code, for example the code known by the person skilled in the art under the name of APOLLO 2F. The flux distribution is then calculated by a diffusion code, for example the code known by the person skilled in the art under the name of "SMART three-dimensional nodal code". The data calculated are then as follows:

3D distribution of the mean powers per assembly. This MP CAL (x, y, z) power distribution is initiated in the transposition phase;

all maximum pencil powers integrated over the core's active height. For each assembly, only a single pencil is retained, the one that carries the highest integrated power. This group, noted as P CAL DH (x, y), is used in a so-called superposition phase, which enables to calculate the enthalpy elevation factor of the core, noted as EEF;

all local maximal powers. For each plane located at z-point, and for each assembly, only a single pencil is retained, that which carries the maximum local power. This group, noted as P CAL (x, y, z), is used in the superposition phase when calculating the hot spot factors of the FQ, FXY (z) cores.

The reconstruction process of the measured power distribution, on its part, essentially involves three terms.

The first term is the fission reaction rate in the detector, still called "activity".

The second term involves the ratio between the mean power of an instrumented assembly and the activity witnessed by a detector circulating inside the glove finger of said assembly. As already stated, it is not the power but the activity that is measured; it is thus necessary to adopt a method that enables to pass from activity to power, a method whose general principles are provided hereunder: the neutron absorption reaction by the detector's sensitive matter is produced inside an energy band characteristic of the latter. Gaining knowledge of the quantity of neutrons belonging to said energy band in relation to the total number of neutrons is a problem of neutron spectrum. The power/activity ratio is a parameter resulting from the 3D core calculations performed for all assemblies. These calculations take account, not only of the local spectrum effects through the intermediary of the neutron counter-reaction system, but also of the flux distribution. These ratios are updated according to the fuel depletion for the purpose of taking account of the evolution of the isotopic concentrations inside the assembly. In this connection, an assumption is made, consisting of recording that the ratios between the calculated values and the values reconstructed on the basis of experimental acquisitions are equal for both variables, activity and power alike.

The third term is called "fine structure"; it enables to pass from the mean power of an assembly to the power of any pencil of said assembly. In order to do so, it is assumed that, for a given assembly, the ratio between the power of a pencil and the mean power of the assembly to which belongs such pencil is independent of the origin of said power, whether reconstructed or calculated. Moreover, a correction will be applied in accordance with the calculation/measurement gaps observed around the assembly. This correction leads to producing a plane-type two-dimensional linear interpolation. The interpolation is performed for each assembly and at each z-point.

Moreover, in order to calculate the reconstructed power at all the non-instrumented points of the reactor, a method has been proposed enabling to estimate the calculation/measurement gaps at all other points of the core than those actually having been measured. This is the object of the error propagation method described in the following paragraphs.

The error propagation process, which is explained hereunder, begins by an operation consisting, first of all, of calculating the gaps between the values actually measured and the values calculated for each assembly instrumented by the instrumentation system. Taking account of the existence of the theoretical calculation and of the previously described measurement process, for each of the instrumented assemblies, not only is known the value of the activity measured by the detectors, but also the corresponding value calculated under conditions very similar to the experimental conditions, and this for each of the axial grid cells.

The error propagation process is, in general terms, conducted as follows: its aim is to determine, for each plane of the z-point, a degree-3 selected Sz surface in (x, y) for the complete maps, that is able to represent distribution of the gaps between the calculated activities and the measured activities throughout the core. It will be noted that the choice of said degree depends on the density of the available instrumentation. This method is described by the expression, "GSF error propagation method (Generalized Surfaces)".

As already stated, it is possible to calculate the gap between the measured activity and the theoretical activity at each instrumented position. It is then assumed that the distribution (x, y) of the gaps at the z-point, between the theoretical activity and the measured activity for all the assemblies, can be approached by a (x, y) Sz surface, being expressed analytically by a k-degree bi-dimensional polynomial, fixed by choice at the 3 value for the complete maps. The coefficients of the polynomial characterising this response surface are determined by minimising an F error function with several variables, each one being one of the polynomial coefficients. The minimisation process is a standard least squares' process performed on each axial measurement and reducing to a minimum the difference between the gaps previously obtained and the gaps calculated using the polynomial on all the instrumented assemblies.

In practice, the extension process thus employs a standard gap minimising method, for the RIC system, on the 60 instrumented positions and, for each axial measurement, between the initial calculation/measurement (C/M) gap and the value given by the response surface. Hence, an analytical function in (x, y, z) is available, which enables calculation of the calculation/measurement gaps in all the reactor core positions. These gaps are then used to correct the theoretical values at all points. After normalization throughout the core, a reconstructed power distribution is obtained across the entire volume of the reactor. In the end, everything happens as though the calculation was being forced to approach the 60 measurement points as well as possible, the reconstructed power distribution being none other than the power distribution resulting from such forcing.

By consequence, the error propagation process is associated with a particular uncertainty component, noted as $R_{U2}^N$, used in the calculation of an overall uncertainty, which in turn is used in a total margin report to be considered across the whole of the nuclear reactor considered.

As a general rule, total uncertainty $E_U^N$ is defined by the following relation, corresponding to a standard quadratic reassembly:

$$E_U^N = \sqrt{(\mu_U^N)^2 + (R_{U1}^N)^2 + (R_{U2}^N)^2 + (M_U^N)^2} \quad \text{(Equation 1)}$$

The various components used in equation 1 are as follows:
the distribution of 3D local pencil power in each assembly may only be deduced from the theoretical example simulating the experimental conditions. The $\mu_U^N$ uncertainty calculation on this fine structure is thus the first component;
the response of the detectors not being, as previously stated, of the power type, but of the activity or reaction rate type, an assumption should be made in that the Calculation/Measurement gaps of the activity type can be transposed to the power parameter. The $R_{U1}^N$ uncertainty component is associated with this transposition assumption;
the Calculation/Measurement gaps observed in the partial geometrical field and covered by the detectors are propagated throughout the core: the $R_{U2}^N$ uncertainty component, or so-called "error propagation uncertainty component", is associated with the corresponding algorithm;
the last component characterises the detector, or the combination of detectors, whether from the signal's physical aspect or from that of the whole of the acquisition process. These different aspects are then covered by the $M_U^N$ uncertainty component. This uncertainty component is referred to as "detector-intrinsic uncertainty component".

An outline of the calculation method for the error propagation uncertainty component, such as used in the prior art, is illustrated when referring to FIG. 1.

This figure illustrates the fact that, for such a calculation, a real state 100 is used from the outset, which, by definition, presents an unknown power distribution, yet to be determined. As previously explained, a series of measurements 101 are taken—sixty in the case of the RIC system—across the whole of the reactor core. In parallel, as also already explained, a theoretical power distribution model 102 is available, such as prepared in R&D bureaus, which provides a complete mapping of the power distributions inside the reactor core.

A step 103 is then undertaken, during which are calculated the gaps, or differences, noted as C/M, between the actually measured values and the values expected by the theoretical calculation, and this for all points of the reactor for which a measurement is available.

Based on the gaps obtained, gaps, noted as (C/M)*, are then determined in a step 104, according to the aforementioned error propagation process, for all the points of the nuclear reactor. A generalised or extended gap is then obtained, deriving from the error propagation process, a gap to be applied on each calculated activity value, in order to obtain an estimated activity value for each point of the nuclear reactor.

The extension uncertainty component ($R_{U2}^N$) is directly calculated, on its part, within a step 105, using the constituted residue, for each point having undergone an experimental measurement, by the difference between the extended gap (C/M)* and the initial C/M gap corresponding to this point, for example, by taking a mean quadratic of said residue.

Finally, in a step 106, following the aforementioned activity/power transposition step, a $P_{est}$ estimated power is determined at every point of the nuclear reactor core, value $P_{est}$ being specific to each point of the reactor core.

The solution for determining the error propagation uncertainty component ($R_{U2}^N$) just explained is applicable to any nuclear reactor core for which measurements can effectively be performed, notably via the RIC system. But such a solution is not applicable to nuclear reactor cores which are about to be installed, for which no flux distribution measurement has been performed yet, nor for existing nuclear reactor cores for which a new instrumentation system is planned to be installed.

Nevertheless, such changes are now in the process of becoming available. Indeed, the IT progress over recent years has enabled the generalization of 3D models for core calculations, not only in R&D bureaus, but also online, such models then being up-dated with the operating parameters of the relevant section in real time. Technological evolutions linked to sensors have also enabled the constant availability of signals supplied by the detectors placed in fixed positions inside the core.

New instrumentation systems, having the purpose of monitoring operating margins online, can thus be defined. Nevertheless, the corresponding uncertainties, associated with such new systems, must of course undergo evaluation prior to industrial installation, i.e. in the absence of any operating feedback on said systems.

In this context, determination of the $R_{U2}^N$ error propagation uncertainty component thus becomes of interest for nuclear reactors and for which a new instrumentation system is liable to be used. Indeed, in such a case, a major problem comes to light for the determination of the $R_{U2}^N$ uncertainty component: due to the measurement system for installation being relatively new, no operating measurements are available for determining said uncertainty component.

Hence, a method is now proposed enabling to obtain an error propagation uncertainty component for any nuclear reactor, even those waiting to be equipped with a measurement instrumentation system and for which no operating feedback with regard to the relevant system is available. For this purpose, data originating from feedback acquired by way of a reference instrumentation system, for example the RIC system, is proposed. Such available feedback is then used for the purpose of applying disruptions to a theoretical power distribution model, the amplitude and the apportionment within space are such that the gaps observed between the disrupted theoretical model and the theoretical model directly deriving from the calculation are representative of those observed in reality.

Hence, the problem posed by such lack of operating feedback with regard to a new measurement system can be overcome by using considerable feedback already acquired by way of a reference instrumentation. Such feedback essentially resulting in a 3D Calculation/Measurement gap database, theoretical disruption models are thus proposed for application, in the invention, whose amplitude and apportionment will be such that the 3D gaps, the noted gaps, such as subsequently explained, and the Calculation/Pseudo-Measurement, in relation to the initial models, are representative of those actually present in the nuclear reactor core on which is implemented the method according to the invention.

Hence, for example, for nuclear reactor cores waiting to be equipped with measurement systems of the collectron type, for which feedback, having the characteristics required for the planned application, may be considered as inadequate, a disrupted theoretical model will be established using the measurements performed by means of the RIC systems, which have the advantage of offering significant feedback, enabling to precisely define the disruptions to be applied to a purely theoretical model.

FIG. 2 illustrates an outline example for implementing the method, such as used for calculating the error propagation uncertainty component. In order to mark the difference, when determining this uncertainty component, between the method of FIG. 1 and this new method, the latter, when deriving from the new method, is noted as $R_{U2p}^N$.

In this figure, it is illustrated that, in the new method, a so-called disrupted state 200 is used from the outset, which corresponds to a theoretical power distribution model 201, to which is applied, at each point of the nuclear reactor core, at least one physical disruption parameter. In a particular embodiment of the method, such disruption is applied to all the points of the nuclear reactor core.

For example, the physical disruption to be applied corresponds to one or several physical parameters from among the following:

misalignment of at least one control cluster in relation to the other control clusters of the considered nuclear reactor core;

lack of precision on the position of the control clusters; these first two physical parameters are linked to the fact that the control clusters, which are traditionally introduced through the top of the reactor core, and have the task of controlling the power of the reactor core, or even to completely shut down the latter in the event of a serious incident, are activated by the complex mechanical systems of said control clusters, the precision of their movements and even their relative movements;

lack of precision on the input temperature of the moderator;

inhomogeneity of the boron concentration;

inhomogeneity of fuel assembly irradiation;

lack of precision on the nominal power of the reactor core;

unbalance, whether azimuthal or radial, in the apportionment of nuclear power between quadrants of the reactor core.

Appropriately, the values of the disruptions applied originate from a database deriving from experimental data obtained on nuclear reactor cores representing similarities with the reactor core on which the new method is implemented. The similarities presented essentially concern the spatial organisation of the fuel assemblies inside the reactor core with, for example, similarities in the observed apportionment symmetries. Conversely, it is not indispensable for the nuclear reactor core, on which the new method is implemented, to have the same type of measurement instrumentation. It is thus possible to use experimental results collected by means of a RIC system in order to determine the disruptions to be applied to the points of a nuclear reactor core which will be equipped with a different type of measurement instrumentation system, for example the aeroball or collectron type.

In the illustrated new method, in a step 202, a series of activity values or reaction levels, referred to as pseudo-measurements, are selected from among the values defining the disrupted state of the nuclear reactor core; then, in a step 203, an initial gap is determined, noted as (C/PM), between the theoretical reaction rate and the corresponding pseudo-measurement, for each point of the nuclear reactor associated with a selected pseudo-measurement.

In a step 204, using determined initial gaps, an error propagation process is then performed throughout the reactor core in order to associate an extended correction value, noted as (C/PM)*, with each point of the nuclear reactor core.

In a step 205, estimated power is then determined for each point of the nuclear reactor, the extended correction value being used as a parameter in said estimated power determination.

According to the new method, it is then possible, in a step 206, to calculate a plurality of residue by performing the difference, for at least a plurality of nuclear reactor core points, between the estimated power and the disrupted representation of said power for each point considered; the $R_{U2p}^N$ error propagation uncertainty component then being established using the evaluated residue, for example, by performing their mean quadratic. Appropriately, the residue is calculated for all the points of the nuclear reactor.

Hence, to resume, the new method for determining an uncertainty component, called "error propagation uncertainty component", involved in the calculation of an overall uncertainty associated with the power distribution of a nuclear reactor core, is characterised by the different steps consisting of:

establishing a three-dimensional mapping of a theoretical power distribution of the considered nuclear reactor core; appropriately, three-dimensional theoretical power distribution mappings are available for various configurations of the nuclear reactor core.

establishing a disrupted representation of the nuclear reactor core, the disrupted representation consisting of applying at least one physical disturbance parameter to the theoretical power distribution for at least a plurality of points of the nuclear reactor core;

selecting a series of activity values or reaction levels, referred to as pseudo-measurements, within the disrupted representation of the nuclear reactor core;

determining, for each point of the nuclear reactor associated with a psuedo-measurement, an initial gap between a theoretical activity, deriving from the theoretical three-dimensional mapping of the nuclear reactor core, and the pseudo-measurement, deduced from the disrupted model, associated with the considered point in question;

performing, using determined initial gaps, an error propagation method operation on the whole of the reactor core in order to associate an extended correction value with each point of the nuclear reactor core;

determining, for each point of the nuclear reactor, an estimated power, the extended correction value being used as a parameter in said estimated power determination;

calculating a plurality of residue by performing the difference, for this same plurality of points of the nuclear reactor core, between the estimated power and the disrupted representation of said power for each point considered;

determining the error propagation uncertainty component using the residue just evaluated.

The expression "point of the nuclear reactor core" refers to a nuclear reactor volume to which a power value, or a physical parameter value in relation to the power, should be assigned, in the context of preparing a 3D power distribution. Each point of the nuclear reactor core is thus associated with a single such value.

Appropriately, the applied physical disruption parameter adopts a value deriving from measurements previously performed for comparable design nuclear reactor cores; the expression "comparable design nuclear reactor core" refers to nuclear reactor cores whose architecture, notably in terms of the general fuel assembly disposition, presents significant elements of resemblance with that of the nuclear reactor core on which is applied the method according to the invention. Hence, the method can be applied indifferently to 2-Loop (121 assemblies), 3-Loop (157 assemblies), 4-Loop (193 assemblies), N4 4-Loop (205 assemblies) and EPR (241 assemblies) cores. The ratio between the number of instrumented assemblies and the total number of assemblies for the reactor cores, other than those of the EPRs, is approximately 30% ($30/121=0.25$, $50/157=0.32$, $58/193=0.30$ and $60/205=0.29$). In the case of EPRs, this ratio is $40/241=0.17$. The method described is notably used, with identical instrumentation, for quantifying the impact of the significant reduction of this ratio on the extension factor. Such quantification has thus been performed in order to pass from 58 instrumented channels to 42 (in the context of a complementary RIC scheme, deriving from the introduction of 16 collectron rods into guide tubes, which were normally monitored by the mobile probes: $42/193=0.22$ and $42/58=0.72$), and from 58 channels to 16 (in the context of the aforementioned collectron scheme).

Hence, equation 1, which defines the final reassembly of the $E_U^N$ reconstruction uncertainty deriving from a process being applied to the triplet (actual configuration of the core, simulated theoretical configuration, C/M gaps), is then replaced by equation 2, defining the same reassembly using a new triplet (disturbed theoretical configuration, initial theoretical configuration, C/PM gaps).

Equation 1 then becomes:

$$E_{Up}^N = \sqrt{(\mu_U^N)^2 + (R_{U1}^N)^2 + (R_{U2p}^N)^2 + (M_U^N)^2} \qquad \text{Equation 2}$$

The prime meaning of p index of this relation is: to essentially make a clear distinction in terms of the triplets, which are upstream of the final reassembly.

The term $(E_{Up}^N)$ of the equation 2 has the same meaning as the uncertainty $(E_U^N)$ of the relation 1. It is thus composed of the same terms. The two factors assigned upon initial order via a change in the instrumentation system are of course the component $(M_U^N)$, characterising the detector used, and the component $(R_{U2}^N)$, covering the passage of the experimental data on a partial field towards 3D maximum local power at every point of the core.

The component $(R_{U2}^N)$ will always be concerned by a change in the instrumentation system. Its standard evaluation resides on a comparison between the extended (C/M)* gap, via the retained error propagation algorithm, at a point monitored by the available instrumentation, and the initial C/M deviation, at an effectively instrumented point. Such comparison thus involves the existence of an experimental reference, said reference being partial in all cases.

In order to compensate this partial character, the new method enables the making of such comparison on a complete whole. The $R_{U2p}^N$ component is now evaluated by comparing the 3D local power distributions, reconstructed at every point of the core, and the equivalent distributions of reference, determined in the context of the new method.

Additionally, it can be stated that, in order for the distributions of the C/PM gaps to be representative of the C/M gaps actually observed during the monitoring of the reactors under operation, the types and the amplitude of the disruptions applied to the generic models must have been correctly defined.

Such definition passes through the construction of a real reference base, covering the maximum number of configurations, under the dual aspect of the assembly types loaded inside the operating reactors and the mode of managing the time spent by said assemblies inside the reactor.

The definition of the series of Pseudo-Measurements is one of the aims assigned to the reference models. It is thus essential that such series are as close as possible to those actually observed on site for each of the analysed instrumentation systems.

At the same time, it is thus necessary to take account of all the characteristics of these systems and of the impact of such characteristics in relation to the response of the RIC reference system. These impacts are linked:

a) to the change in the radial density of the instrumented channels ($58\rightarrow42$ channels for the complementary RIC schemes of a standard 4-Loop core and $58\rightarrow16$ for the collectron schemes of such same cores);

b) to the type of detector (Uranium 235 in the case of the RIC, and Rhodium 103 in the case of the collectrons);

c) to the change of the measurement points in the axial apportionment in the case of collectron-type detectors (65 continuous grid cells$\rightarrow$8 discontinuous grid cells); hence the necessity for a grid-cell conversion;

d) to the characteristics of $M_U^N$ experimental uncertainty.

In the case of RIC-type signals, such uncertainty only comprises a 3D local part, regardless of time.

In the case of collectrons, it is important to take account of the 3D and 2D components (per rod) of such uncertainty and of its variability during the wear process.

In order, on the one hand, to minimise the number of disrupted configurations to be constructed, and to further consolidate the link with the real experimental database on the other, a differential approach has been chosen for the first practical applications of implementing the new method in relation to the reference instrumentation.

The internal instrumentation of MFC-type (Mobile Fission Chamber), used in the RIC system, is in fact considered as a reference instrumentation due to:

1. its axial resolution (1 acquisition/mm);
2. its self-calibration (several detectors are able to monitor the same channel);
3. its precision, regardless of time (negligible wear since the detectors are only irradiated approximately 1 hour per month);
4. almost complete coverage per quadrant in the cases of current 3-Loop and 4-Loop cores;
5. well-controlled final uncertainty ($E_U^N$) and relying on a considerable experimental database.

Reassembly is thus carried out according to the following relation:

$$(E_U^N)_{SchX} = (E_U^N)_{REF} + (\Delta E_{Up}^N)_{SchX}^{REF} \qquad \text{Equation 2a}$$

The SchX term refers to the expression "Scheme X", applying to all instrumentation systems different than the reference instrumentation system (referred to by the term REF). The $(\Delta E_{U2p}^N)_{SchX}^{REF}$ corrective term of equation 2a, defining this differential reassembly, can thus be applied using:

$$(E_{Up}^N)_{REF} = \sqrt{(\mu_U^N)^2 + (R_{U1}^N)_{REF}^2 + (R_{U2p}^N)_{REF}^2 + (M_U^N)_{REF}^2} \qquad \text{(equation 3)}$$

And $$(E_{Up}^N)_{SchX} = \sqrt{(\mu_U^N)^2 + (R_{U1}^N)_{SchX}^2 + (R_{U2p}^N)_{SchX}^2 + (M_U^N)_{SchX}^2} \qquad \text{(equation 4)}$$

This corrective term contains not only the $(\Delta R_{U2p}^N)_{SchX}^{REF}$ difference, but also those that resulting from a change in detector or from a combination of detectors; hence, for example, the variations $(\Delta R_{U1}^N)_{SchX}^{REF}$, $(\Delta M_U^N)_{SchX}^{REF}$ and/or $(\Delta X_U^N)_{SchX}^{REF}$, X then referring to an uncertainty factor only existing for the SchX configuration.

From the aspect of the distributions of the reconstructed power, the $R_{U2p}^N$ component remains the characteristic indicator of any instrumentation system. The $(\Delta R_{U2p}^N)_{SchX}^{REF}$ difference is thus the determining parameter during the dimensioning of the $E_U^N$ uncertainty and it has been analysed for all configurations of the disruption database.

The variability observed on the $(\Delta R_{U2p}^N)_{SchX}^{REF}$ difference is, for the most part, a consequence of the $M_U^N$ factor via the 3D sound-effect process of the Pseudo-Measurements. In practice, this difference is defined upstream of the final reassembly via the use of a statistical approach.

BACKGROUND OF THE INVENTION

As previously explained, in several reactor cores, sensors belonging to the RIC-type instrumentation system have been replaced by collectron-type sensors. Such reduction, which typically involves passing the number of sensors of the RIC system from 58 to 42, thus makes the number of collectrons fixed in the reactor core amount to 16. Hence, 16 guide tubes, which were normally monitored by mobile probes of the RIC system, are no longer of use when establishing a mapping deduced solely from the RIC sensors. Such a configuration results in a significant reduction in the number of instrumented channels monitored by the sensors of the RIC reference system, such sensors enabling to perform mappings that are normally required for checking the compliance of the reactor's core during start-up tests and for ensuring the periodic monitoring of the hot spot factors throughout the irradiation cycle.

Moreover, in the invention, interest is particularly given to the collectron-type detectors. Collectrons are the detectors located at a fixed elevation inside the nuclear reactor core, and which are able to supply datum on a non-stop basis. The most widespread collectrons are the Rhodium-type collectrons. The measurements performed are directly processed online by an integrated calculator or by a section calculator. The system's response time essentially depends upon the performances of said calculator which determines the calculation time. The operating principles of the collectrons are henceforth known and are available in various literature.

A major problem to be resolved when using the collectrons resides in the fact that the $M_U^N$ uncertainty component increases significantly depending on the time passed inside the reactor and on the wear of the Rhodium emitter associated with the considered collectron.

In order to take account of such wear of the Rhodium emitter, a correction law has been established after seven years of experimentation in a powerful reactor: the application of such law to the signal supplied by a collectron upon completion of an operating t-duration enables to relocate the signal that said collectron would have emitted at the outset. Such law, called "sensitivity law", is stated as follows:

$$S(t) = S(0) \times \left(1 - \frac{Q(t)}{Q_\infty}\right)^a \qquad \text{Relation 0}$$

With:

Q(t)=∫I(t').dt' and where I(t) is the gross current supplied by the detector to a t-instant. In practice, the initial signals supplied by the detector have had to be conditioned by deconvolution methods (in order regain lost time linked to the characteristics of the nuclear reactions in play) and by filtering (in order to reduce the noise induced by the deconvolution methods). The basic term should here be understood as "before correction of wear".

S(0) is the initial sensitivity of the detector and $Q_\infty$ is its total available load.

The exponent a is a coefficient determined empirically as a result of experimentation.

If the current supplied by a collectron at a given point in time of its irradiation is referred to as I(t), and the signal that should have had the same non-depleted collectron is referred to as I(0), then the sensitivity correction is performed according to the following relation:

$$I(0) = \frac{I(t)}{S(t)} \qquad \text{Relation 0bis}$$

A major consequence of the relation 0 is that, by implicating the integrated load, the application of said relation results in an accumulation of uncertainties on the debited current, whereby an increase in the overall error in accordance with the irradiation time.

Hence, this uncertainty, or error, estimated at 2% at the start of life, attains between 4.3% and 68% of wear and exceeds 8% at collectron life end for 80% of wear, such as represented in FIG. 3, which illustrates the sensitivity law and the $M_U^N$ uncertainty component for a Rhodium collectron in accordance with the wear of the considered detector, as well as, for comparison purposes, the uncertainty component $M_U^N$ for a RIC-type detector.

In comparison, it can be recalled that the $M_U^N$ component of the RIC system is less than 2% and undergoes no increase during irradiation.

SUMMARY OF INVENTION

One application of the method according to the invention concerns a collectron-type detector calibration method placed inside a nuclear reactor core. Such an application of the method according to the invention enables to benefit from a signal, supplied by a collectron-type detector, associated with an uncertainty component whose value is not too high, even after prolonged use of the collectron inside the nuclear reactor core. By the term "collectron calibration" is meant the fact of associating a signal, supplied by a collectron, representative of an activity inside a nuclear reactor with an uncertainty component associated with the considered collectron-type detector.

The present invention provides a solution to the problems that have just been evoked. In the invention, a reduction in the spatial density of the reference measurements is proposed, as compensation, via the joint optimal use of measurements deriving from another system. The method used in order to ensure such compensation implements a means based on the mixed mapping principle, which will be developed hereunder. In the method according to the invention, the simultaneous presence of, on the one hand, sensors of the mobile reference instrumentation system (RIC system) and of, on the other hand, acquisitions constantly supplied by the sensors of the fixed instrumentation system (collectrons), is described for the benefit of the user.

One immediate application of implementing the method according to the invention lies in initiating a calibration method of the collectron-type sensors, by using data from the supplementary RIC instrumentation system. Hence, the characteristic of the collectrons, according to which the $M_U^N$ component attains high values relatively quickly, which significantly penalises, for example, all monitoring systems using the continuous acquisitions of collectrons, is resolved.

The present invention thus essentially refers to a method for establishing a mapping representative of a power distribution inside a nuclear reactor core, the said mapping being established by means of detectors placed at least temporarily inside the reactor core, characterised in that it comprises the different steps consisting of:

- equipping, at least temporarily, a first fuel assembly unit of the nuclear reactor core by means of detectors from a first instrumentation system, called "reference instrumentation system".
- equipping, at least temporarily, a second fuel assembly unit of the nuclear reactor core by means of detectors from a second instrumentation system;
- performing a first partial series of activity measurements by means of the reference system detectors;
- performing a second partial series of activity measurements by means of the detectors from the second instrumentation system;
- converting the activity measurements of the second series of measurements into activity measurements associated with the reference instrumentation system in order to obtain a series of converted measurements;
- establishing, by way of the first partial series of activity measurements, of the series of converted measurements, of a complete theoretical distribution of the theoretical activities associated with the reference instrumentation system, and of a complete theoretical distribution of the theoretical activities associated with the second instrumentation system, for every instrumented point of the nuclear reactor core, a final series of experimental reactor core activities, said data series only comprising the values relating to the activities associated with the reference instrumentation system;
- establishing (307), by way of the final series of experimental data and of theoretical data simulating a state of the reactor core at the time of the embodiment of the first series of measurements and of the second series of measurements, the mapping being representative of a power distribution mechanism inside a nuclear reactor core.

Besides the main characteristics just mentioned, the method according to the invention may represent one or several additional characteristics from among the following:

the step whereby conversion of the activity measurements of the second series of measurements into the activity measurements associated with the reference instrumentation system complies with the following relation:

$$A_{1 \leftarrow 2}^{CONV} = g \cdot \left(\frac{A_1}{A_2}\right)^{CAL} \cdot \left(A_2^{MES}\right)_{relatif}$$

where:

$A_2^{MES}$ is the distribution of the activities measured by the detectors of the second instrumentation system, whose elements are linked by a normalization of series;

$A_1^{CAL}$ and $A_2^{CAL}$ are the distributions of the equivalent activities calculated for the detectors of the first instrumentation system and of the second instrumentation system, respectively;

$A_{1 \leftarrow 2}^{CONV}$ is the conversion of an activity measured by a detector of the second instrumentation system into an activity that would be detected by a detector of the first instrumentation system;

g is a coefficient reporting the normalization differences between the two distributions.

the step of converting the activity measurements of the second series of measurements into the activity measurements associated with the reference instrumentation system is followed by a normalization operation complying with the following relation:

$$A_1^{mixte} = \frac{\sum_1^{N1} \left(A_1^{MES}\right)_{relatif} + \sum_1^{N2} A_{1 \leftarrow 2}^{CONV}}{N1 + N2}$$

where:

N1 and N2 are the number of acquisitions for the detectors of the first instrumentation system and of the second instrumentation system, respectively;

$(A_1^{MES})_{relatif}$ is the distribution of the activities measured by the detectors of the first instrumentation system, whose elements are linked by a normalization of series;

$A_{1\leftarrow 2}^{CONV}$ is the conversion of an activity measured by a detector of the second instrumentation system into an activity that would be detected by a detector of the first instrumentation system.

- the reference instrumentation system is a system with mobile detectors.
- the second reference instrumentation system is a system with fixed detectors.
- the reference instrumentation system is a RIC-type system.
- the second reference instrumentation system uses collectron-type detectors.

The present invention also refers to a method of correction for a component of intrinsic uncertainty associated with a collectron-type detector placed inside a nuclear power plant core, characterised in that it comprises the step consisting of performing a calibration operation on the considered collectron, the calibration operation being performed when the collectron-type detector has attained a given level of wear, the calibration operation consisting of performing a three-dimensional calibration using a mapping determined, with a reference instrumentation system implicating RIC-type detectors, by the method described above.

This three-dimensional calibration resides on a particular mixed mapping methodology application, such application enabling to define the 3D factors that come to correct the values of the sensitivity law in the (XYZ) positions monitored by the collectrons.

Besides the main characteristics just mentioned, the correction method may represent one or several additional characteristics from among the following:

- the calibration operation, consisting of performing a three-dimensional calibration using flux maps determined for the detectors of RIC-type detectors, provides, at the given wear level at which the calibration operation is performed, as value on the intrinsic uncertainty component of the considered collectron-type detector, the value of the determined intrinsic uncertainty component for a new detector, increased by a value called "calibration uncertainty";
- the level of given wear, for which a calibration operation of the considered collectron is performed, is comprised between 50% and 60% of wear of the said collectron.

The invention and its different applications will be better understood upon reading the following description and after studying the figures attached thereto.

BRIEF DESCRIPTION OF THE DRAWINGS

These are only shown as examples and should not be considered as complete with regard to the invention. The figures show.

DETAILED DESCRIPTION OF THE INVENTION

Figure 1:
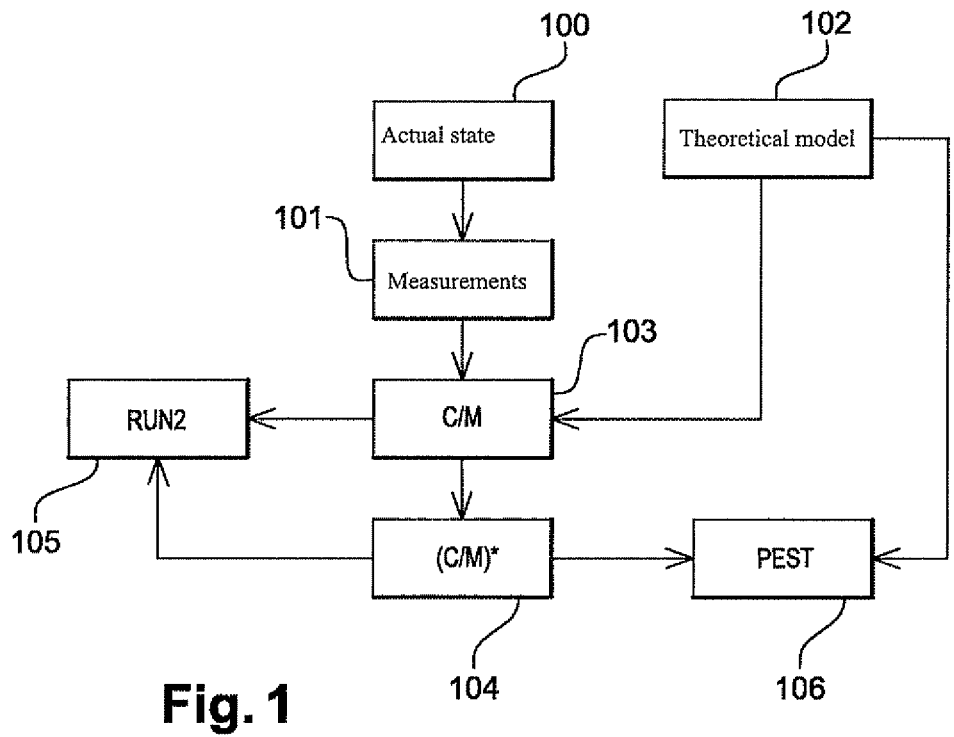
in FIG. 1, already described, an outline representation of the various steps of a method of the prior art, illustrating the extension process of the C/M gaps observed in a nuclear reactor core.

The method according to the invention uses algorithms developed in the context of the mixed flux maps, in which the method according to the invention finds its reasoning. A brief presentation of the mixed flux map principles is now recalled.

First presented below are the algorithms for processing the mixed flux maps.

For mechanical reasons, the fixed IN-CORE detectors may only be installed in positions normally monitored by mobiles IN-CORE detectors of the RIC system. The result causes a reduction in the data density available via said reference system. In order to compensate such reduction and therefore to avoid possible penalties, it thus became interesting to properly use all the available experimental data at the same time. The combination of the experimental distributions deduced from the two systems during an EP11-type measurement campaign enables to retrieve maximal density.

The combination method of the mixed flux maps is briefly described below:

Two experimental distributions of different types {A1} and {A2} and also comprising a different number of elements (N1, N2). Each of these units being normalized per unit, the elements A1 and A2 are linked by the following relations:

$$\sum_1^{N1} A1 = N1 \text{ et } \sum_1^{N2} A2 = N2 \qquad \text{Relation 1}$$

These separate initial normalizations are indispensable since the values deduced from the two acquisition systems are expressed in different units and, moreover, do not necessarily have the same physical nature.

The aim is to obtain a new series, also normalized per unit and comprising elements N1+N2. In order to do so, it is first necessary to make the two units coherent under the aspect of their physical nature.

These two distributions being able to be determined using theoretical models, the combination method is then based on the invariance assumption of the MES/CAL report:

$$\boxed{\frac{A_1^{MES}}{A_1^{CAL}} \approx \frac{A_2^{MES}}{A_2^{CAL}}} \qquad \text{Relation 2}$$

The symbol "≈" appearing in the relation 2 is rather a symbol of proportionality, implying that the corresponding equivalence is unable to be directly applied in order to convert type 2 data into type 1 data: it is in fact necessary to bear in mind that the initial normalizations refer to different units under the double aspect of the spatial apportionment and of the number of elements. The conversion of a type 2 element must be carried out based on gross values:

$$(A_{1 \leftarrow 2}^{CONV})_{brut} = \left(\frac{A_1}{A_2}\right)^{CAL} \cdot (A_2^{MES})_{brut} \quad \text{Relation 3}$$

The gross label here implies "by identical normalization". The A1/A2 conversion ratio of the relation 2 may nevertheless be used "as is", since its two components have been obtained on the same unit: the entire active core.

The aim being sought is thus to approach, as near as possible, the gross value that would have been obtained in the case of a homogenous instrumentation. This aim is recorded as:

$$(A_{1 \leftarrow 2}^{CONV})_{brut} = (A_1^{MES})_{brut} \quad \text{Relation 4}$$

The indexed gross values not generally being available within a common unit, any comparison implies normalization and thus definition of the relative values:

$$A_{relatif}^{ensemble\ N} = \frac{A_{brut}}{A_{brut}^{ensemble\ N}} \quad \text{Relation 5}$$

The relation 3 is applied to the gross values. The use of the relative values, the only ones truly available, obliges addition of a g coefficient to said relation, in order to have knowledge of the normalization differences:

$$A_{1 \leftarrow 2}^{CONV} = g \cdot \left(\frac{A_1}{A_2}\right)^{CAL} \cdot (A_2^{MES})_{relatif} \quad \text{Relation 6}$$

the problem then being to determine the g factor.

Due to the simultaneous unavailability of the real gross values of type 1 and type 2 data, the g factor shall be evaluated by considering that the values deduced from the complete theoretical distributions have the gross label, since such values originate from identical normalizations. Under such conditions, the relations 3 and 4 may be recorded in the following manner:

$$(A_{1 \leftarrow 2}^{CONV})_{brut} = \left(\frac{A_1}{A_2}\right)^{CAL} \cdot (A_2^{CAL})_{complet} \quad \text{Relation 7}$$

$$(A_{1 \leftarrow 2}^{CONV})_{brut} = (A_1^{CAL})_{complet} \quad \text{Relation 8}$$

The values effectively available being relative values defined by the relation 5, the relation 9 is thus recorded as follows:

$$(A_1^{CAL})_{relatif\ N1} \cdot (\overline{A}_1^{CAL})_{N1/complet} = \left(\frac{A_1}{A_2}\right)^{CAL} \cdot (A_2^{CAL})_{relatif\ N2} \cdot (\overline{A}_2^{CAL})_{N2/complet}$$

The equivalence of the relations 6 and 9 provide the value of the g coefficient:

$$\boxed{g = \frac{(\overline{A}_2^{CAL})_{N2/complet}}{(\overline{A}_1^{CAL})_{N1/complet}}} \quad \text{Relation 10}$$

The definition of the new unit is then based on the normalization of the initial activities $(A_1^{MES})_{relatif}$ and the converted activities $A_{1 \leftarrow 2}^{CONV}$ via the relation 6. This final normalization is recorded as:

$$A_1^{mixte} = \frac{\sum_1^{N1} (A_1^{MES})_{relatif} + \sum_1^{N2} A_{1 \leftarrow 2}^{CONV}}{N1 + N2} \quad \text{Relation 11}$$

This 'mixed' unit is thus completely defined and possess all the necessary characteristics (coherence and standard).

The relation 6 reveals ratio $(A_1/A_2)$ enabling conversion of type 2 into type 1, with the g coefficient giving information on the normalization differences.

Uncertainty on the $A_1/A_2$ ratio may be established in a similar manner to that already implemented for the $\overline{P}/A$ ratio, evoking the correlation existing between the activity in the instrumented channel and the mean power of the assembly containing said channel; it is recalled that the uncertainty associated with the use of this ratio is recorded as $R_{U1}^N$.

The typical gaps characterising the uncertainties on the two terms of this ratio are designated by $\sigma_{A1}$ and $\sigma_{A2}$. Hence:

$$\sigma_{A1/A2}^2 = \sigma_{A1}^2 + \sigma_{A2}^2 - 2 \cdot r \cdot \sigma_{A1} \cdot \sigma_{A2}$$

with r characterising the correlation between the terms A1 and A2.

Feedback from the reactor known as the CATTENOM 1 reactor illustrate that the C/M gaps are almost the same as the units A1 (U5) and A2 (Rh). Hence, $\sigma_{A1} = \sigma_{A2} = \sigma_A$, which completely defines the conversion component of the $T_U^N$ factor:

$$(\sigma(T_U^N))_{conversion}^2 = \sigma_{A1/A2}^2 = 2 \cdot (1-r) \cdot \sigma_A^2 \quad \text{Relation 12}$$

The coefficient of correlation r may then be obtained by plotting A2 in accordance with A1 for symmetrical positions. In the case of the $R_{U1}^N$ uncertainty factor, the correlation coefficient was found to be higher by 0.95 in more than 95% of cases. This is also the case for the couples (A1, A2): the digital value to be allocated to the $(\sigma(T_U^N))_{conversion}$ factor will thus be the same as the $\sigma(R_{U1}^N)$ factor.

The uncertainty associated with the g coefficient may, on its part, be evaluated by using the existing complete maps established using the RIC systems. Comparison of the power distributions reconstructed by said method (42+16) with the standard distributions reconstructed with the sketch 58 enables to quantify the $(T_U^N)_{normalisation}$ factor.

The two effects, conversion type and normalization, being independent, hence:

$$(T_U^N)^2 = (T_U^N)_{conversion}^2 + (T_U^N)_{normalisation}^2 \quad \text{Relation 13}$$

Now the algorithms for processing the mixed flux maps are applied to the calibration of the collectrons.

This method is in fact an extension of the algorithms implemented for the mixed maps (RIC 42 channels+COL 16 rods). The departure point is the same: conversion of the collectron signals into Pseudo RIC signals. However, here the collectron signals used upstream of the process are non-corrected signals of the law of wear; they are only deconvoluated and filtered. The first relation of the method is then:

$$A_{PRIC}^{BRUT} = g \cdot \left[\frac{A_{RIC}}{A_{COL}}\right]^{CAL} \cdot A_{COL}^{BRUT} \qquad \text{Relation 14}$$

Following the standard processing of a supplementary RIC flux map (42 channels), RIC activities are available, reconstructed in all points and notably in the positions occupied by the collectrons. Such distribution is thus recorded as $A_{RIC}^{EST}$. A series of 30 corrective factors may now be defined:

$$FCOR = \frac{A_{PRIC}^{BRUT}}{A_{RIC}^{EST}} \qquad \text{Relation 15}$$

Although these 3D correction or calibration factors do not have the purpose of directly correcting the gross collectron activities, the relations hereafter illustrate the process for passing from an initial collectron signal, i.e. not corrected by the sensitivity law, to a signal having the same meaning as a RIC acquisition.

Hence, with $A_{COL}^{COR}$, with the 3D value of a corrected collectron activity:

$$\boxed{A_{COL}^{COR} = \frac{A_{COL}^{BRUT}}{FCOR}} \qquad \text{Relation 16}$$

Still via application of the base relation of the 'mixed map' process, the following can be recorded:

$$A_{PRIC}^{COR} = g \cdot \left[\frac{A_{RIC}}{A_{COL}}\right]^{CAL} \cdot A_{COL}^{COR} \qquad \text{Relation 17}$$

there again, through application of the relation 14:

$$A_{PRIC}^{COR} = g \cdot \left[\frac{A_{RIC}}{A_{COL}}\right]^{CAL} \cdot A_{COL}^{BRUT} \cdot \frac{A_{RIC}^{EST}}{A_{PRIC}^{BRUT}}$$

whereby:

$$A_{PRIC}^{COR} = A_{RIC}^{EST} \qquad \text{Relation 18}$$

This last relation well illustrates that the collectron activities, after conversion of course into Pseudo RIC activities, are calibrated on the RIC-reconstructed activities.

From a practical point of view, the calibration operation is more complex since the aim is then to correct the error committed on the integrated loads due to an accumulation of errors on the current. As soon as implementation of said calibration is decided, the FCOR factors are due to replace, via a process of mathematical equivalence, the S(t) sensitivity law presented in the relation 0 and used in the relation Obis for retrieving the signal that would have had the non-depleted collectron.

The uncertainty associated with such calibration thus comprises, on the one hand, the $T_U^N$ component, defined for the mixed maps (relation 12), and, on the other hand, the $(R_{U2p}^N)_{PIC}^{Sch42}$ component, defined in the context of the application of the $R_{U2p}^N$ method described in the previous paragraph. Whereby:

$$C_U^N = \sqrt{(T_U^N)^2 + [(R_{U2p}^N)_{RIC}^{Sch42}]^2} \qquad \text{Relation 19}$$

The values of these two uncertainty factors are respectively 1.5% and 1.5%, whereby 2.1% for the $C_U^N$ uncertainty. The $M_U^N$ intrinsic uncertainty component at the start of the collectrons' life being by 1.93%, this implies that as of when calibration is activated, the collectrons' final uncertainty would be by 2.9%. This latest value is preliminary, but the fact that it is very clearly lower than the values than it would be necessary to use without calibration is a strong argument in favour of this approach.

Figure 4:
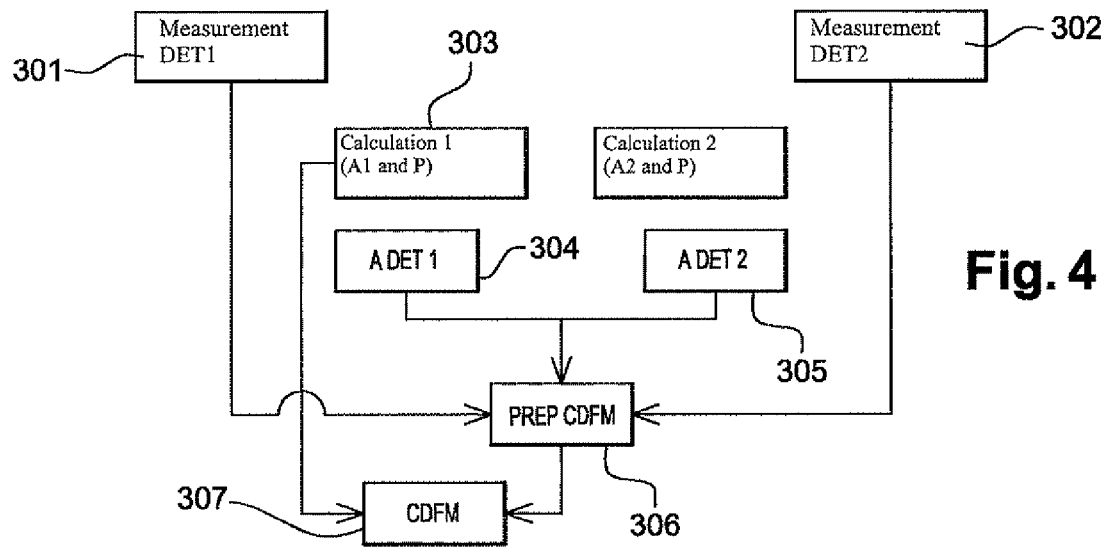
in FIG. 4, an outline representation of the various steps of an implementation example of the method according to the invention.
Figure 3:
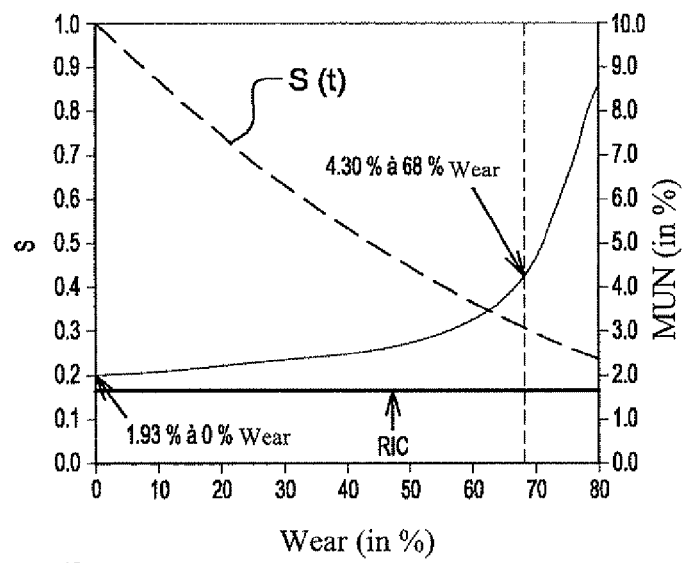
in FIG. 3, also already described, a graphic representation of the sensitivity law and of the evolution of the $M_U^N$ uncertainty component for a Rhodium collectron, depending on the wear of the considered detector, prior to implementing the method according to the invention.

FIG. 4 illustrates an implementation example of the method according to the invention, by notably applying the mixed flux map combination method.

In this Figure, the following abbreviations have been used: MFM=Mixed Flux Map; PREP=PREParation; DET=DETector; A=Activity; P=Power In this Figure, on the one hand is considered a first series of partial measurements 301, performed by means of a first type of sensors, or detectors, belonging to a first IN-CORE instrumentation system present inside a nuclear reactor core, and on the other hand a second series of partial measurements 302, performed by means of a second type of detectors, belonging to a second IN-CORE instrumentation system. By series of partial measurements is meant measurements performed for the sole points of the nuclear reactor equipped with detectors of the considered sensor type.

It is further considered a first complete theoretical distribution 304, i.e. supplying an activity value for each point of the considered nuclear reactor core, available for the first-type detectors, and a second complete theoretical distribution 305, available for the second-type detectors.

Based on these four data series, in a next step, a conversion of the activities associated with the second detector type into the activities associated with the first detector type is performed for the points of the instrumented nuclear reactor core. Such conversion, whose principle resides on the MES/CAL invariance assumption (relation 2), is entirely performed after application of the relation 11.

Hence, a new series of experimental data 306 is obtained, for every instrumented point, whether this be by the first-type sensors or the second-type sensors, the new series of experimental data only comprising values relating to activities associated with the first-type sensors.

Figure 2:
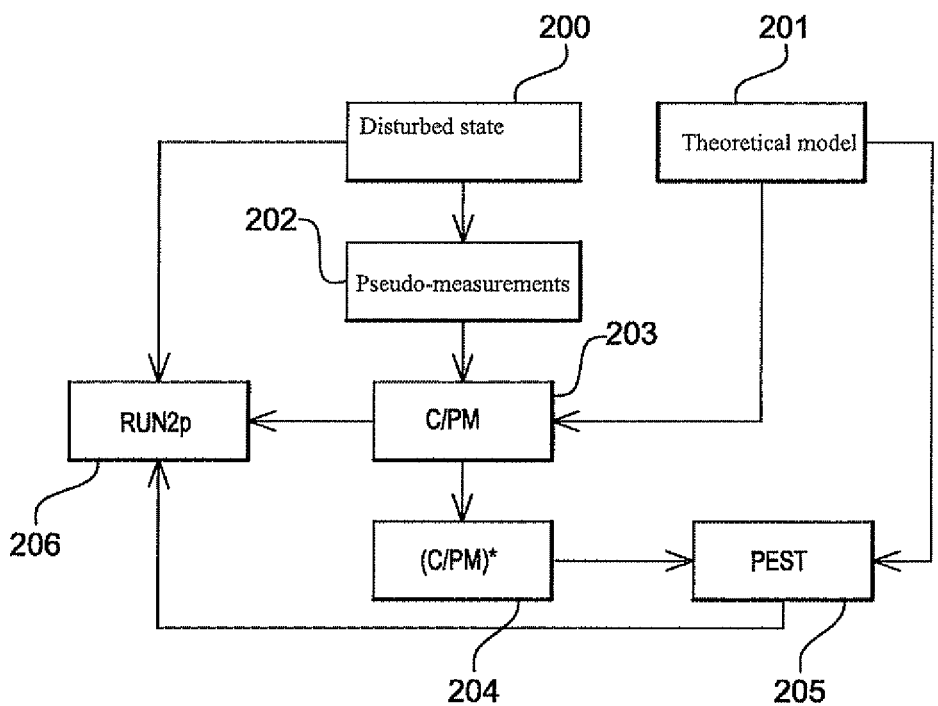
in FIG. 2, also already described, an outline representation of the various steps of an example of the implementation of a new C/M error propagation method and thus of the extension at every point of the core of the C/M gaps observed on a partial field inside a nuclear reactor core.

Based on the new series of experimental data 306, and by implicating a series of theoretical data 303 obtained via a theoretical calculation simulating the state of the core at the time of the double mapping, a standard processing is thus initiated, previously recalled in reference to FIGS. 1 and 2, of a flux map that would have been exclusively obtained by using a satisfactory density.

Figure 5:
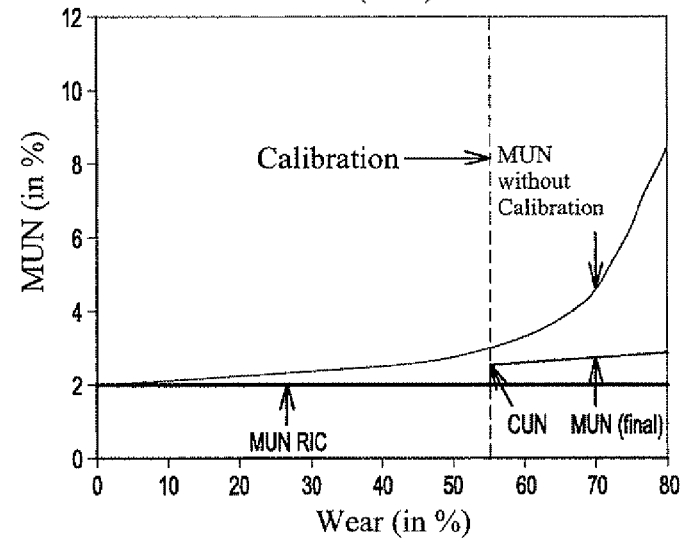
in FIG. 5, a graphic representation of the $M_U^N$ uncertainty component for a Rhodium collectron depending on the wear of the considered detector, after implementing the method according to the invention.

FIG. 5 illustrates the impact of the implementation of the mixed flux map combination method on the evolution of the uncertainty of the Rhodium detectors: in this figure is represented the case where a three-dimensional calibration of a collectron-type detector is performed using RIC flux maps when the wear of the considered collectron is in the region of 55%. Hence, when the calibration is performed, the collectron's $M_U^N$ uncertainty component, when departing from a determined level via the $C_U^N$ calibration uncertainty component, follows the evolution law dictated by the sensitivity law, by considering the latter as of its origin, i.e. by departing from the initial t instant (t=0).

In between two calibrations, the standard correction law is applied using a change of origin. It is thus clear that this process enables to eliminate a vast share of the initial error propagation via the law of wear.

Appropriately, a single calibration is planned: as of 50% of wear. This then allows operating, with a compatible uncertainty level and with the required operating constraints, for 3 to 4 years preceding the decennial of the section: during the corresponding stoppage, all the collections will then be replaced.

This calibration may also be used at the beginning of each cycle, but in that case, without modifying the collectron signals in order to verify the axial positioning of the rods.

The invention claimed is:

1. A method of correction for a component of intrinsic uncertainty, associated with a collectron-type detector placed inside a nuclear power plant core, comprising:
    establishing a mapping as a representation of a power distribution inside the nuclear reactor core, said mapping being established by means of a reference instrumentation system, said mapping comprising;
        equipping, at least temporarily, a first set of fuel assemblies of the nuclear reactor core with detectors from said reference instrumentation system;
        equipping, at least temporarily, a second set of fuel assemblies of the nuclear reactor core with detectors from a second instrumentation system;
        performing a first partial series of activity measurements by means of the detectors from said reference instrumentation system;
        performing a second partial series of activity measurements by means of the detectors from the second instrumentation system;
        converting the activity measurements of the second partial series of measurements into activity measurements associated with said reference instrumentation system in order to obtain a series of converted measurements;
        establishing, by way of the first partial series of activity measurements, of the series of converted measurements, of a complete theoretical distribution of the theoretical activities associated with the reference instrumentation system, and of a complete theoretical distribution of the theoretical activities associated with the second instrumentation system, for every instrumented point of the nuclear reactor core, a final series of experimental reactor core activities, said data series only comprising the values relating to the activities associated with the reference instrumentation system; and
        establishing, based on the final series of experimental data and of theoretical data simulating a state of the reactor core at the time of the performance of the first partial series of measurements and of the second partial series of measurements, the mapping being representative of a power distribution inside a nuclear reactor core
    performing a calibration operation on a collectron, the calibration operation being performed when the collectron-type detector has reached a given level of wear, the calibration operation consisting of performing a three-dimensional calibration using the mapping.

2. The method according to claim 1, wherein the detectors used in the reference instrumentation system are detectors of a mobile internal instrumentation system.

3. The method according to claim 1, wherein the step of performing a calibration operation comprises performing a three-dimensional calibration using the mapping and provides, at the given wear level at which the calibration operation is performed, as value on the intrinsic uncertainty component of the considered collectron-type detector, the value of the determined intrinsic uncertainty component for a new detector, increased by a calibration uncertainty value.

4. The method according to claim 1, wherein the level of given wear, for which a calibration operation of the considered collectron is performed, exceeds 50% of wear of the said collectron.

5. The method according to claim 1, wherein the detectors used in the reference instrumentation system are of the RIC type.

6. The method according to claim 1, wherein the step for converting the activity measurements of the second series of measurements into activity measurements associated with the reference instrumentation system complies with the following relation:

$$A_{1 \leftarrow 2}^{CONV} = g \cdot \left(\frac{A_1}{A_2}\right)^{CAL} \cdot (A_2^{MES})_{relatif}$$

wherein:
  $(A_2^{MES})_{relatif}$ is the distribution of the activities measured by the detectors of the second instrumentation system, whose elements are linked by a normalization of series;
  $A_1^{CAL}$ and $A_2^{CAL}$ are the distributions of the equivalent activities calculated for the detectors of the first instrumentation system and of the second instrumentation system, respectively;
  $A_{1 \leftarrow 2}^{CONV}$ is the conversion of an activity is measured by a detector of the second instrumentation system into an activity that would be detected by a detector of the first instrumentation system; and
  g is a coefficient reporting the normalization differences between the two distributions.

7. The method according to claim 6, wherein the step for converting the activity measurements of the second series of measurements into activity measurements associated with the reference instrumentation system is followed by a normalization operation complying with the following relation:

$$A_1^{mixte} = \frac{\sum_{1}^{N1}(A_1^{MES})_{relatif} + \sum_{1}^{N2} A_{1 \leftarrow 2}^{CONV}}{N1 + N2}$$

wherein:
  N1 and N2 are the number of acquisitions for the detectors of the first instrumentation system and of the second instrumentation system, respectively;
  $(A_1^{MES})_{relatif}$ is the distribution of the activities is measured by the detectors of the first instrumentation system, whose elements are linked by a normalization of series; and
  $A_{1 \leftarrow 2}^{CONV}$ is the conversion of an activity is measured by a detector of the second instrumentation system into an activity that would be detected by a detector of the first instrumentation system.

8. The method according to claim 6, wherein the reference instrumentation system is a mobile detector system.

9. The method according to claim 6, wherein the second reference instrumentation system is a fixed detector system.

10. The method according to claim 6, wherein the reference instrumentation system is a RIC-type system.

11. The method according to claim 6, wherein the second instrumentation system initiates collectron-type detectors.

12. A method for establishing a mapping representative of a power distribution inside a nuclear reactor core, said mapping being performed by means of detectors placed at least temporarily inside the core of the reactor, the method comprising:

equipping, at least temporarily, a first set of fuel assemblies of the nuclear reactor core with detectors from a reference instrumentation system;

equipping, at least temporarily, a second set of fuel assemblies of the nuclear reactor core with detectors from a second instrumentation system;

performing a first partial series of activity measurements by means of the detectors from said reference instrumentation system;

performing a second partial series of activity measurements by means of the detectors from the second instrumentation system;

converting the activity measurements of the second partial series of measurements into activity measurements associated with said reference instrumentation system in order to obtain a series of converted measurements;

establishing, by way of the first partial series of activity measurements, of the series of converted measurements, of a complete theoretical distribution of the theoretical activities associated with the reference instrumentation system, and of a complete theoretical distribution of the theoretical activities associated with the second instrumentation system, for every instrumented point of the nuclear reactor core, a final series of experimental reactor core activities, said data series only comprising the values relating to the activities associated with the reference instrumentation system; and establishing, based on the final series of experimental data and of theoretical data simulating a state of the reactor core at the time of the performance of the first partial series of measurements and of the second partial series of measurements, the mapping being representative of a power distribution inside a nuclear reactor core.

13. The method according to claim 12, wherein the step for converting the activity measurements of the second series of measurements into activity measurements associated with the reference instrumentation system complies with the following relation:

$$A_{1 \leftarrow 2}^{CONV} = g \cdot \left(\frac{A_1}{A_2}\right)^{CAL} \cdot (A_2^{MES})_{relatif}$$

wherein:

$(A_2^{MES})_{relatif}$ is the distribution of the activities measured by the detectors of the second instrumentation system, whose elements are linked by a normalization of series;

$A_1^{CAL}$ and $A_2^{CAL}$ are the distributions of the equivalent activities calculated for the detectors of the first instrumentation system and of the second instrumentation system, respectively;

$A_{1 \leftarrow 2}^{CONV}$ is the conversion of an activity is measured by a detector of the second instrumentation system into an activity that would be detected by a detector of the first instrumentation system; and g is a coefficient reporting the normalization differences between the two distributions.

14. The method according to claim 13, wherein the step for converting the activity measurements of the second series of measurements into activity measurements associated with the reference instrumentation system is followed by a normalization operation complying with the following relation:

$$A_1^{mixte} = \frac{\sum_1^{N1}(A_1^{MES})_{relatif} + \sum_1^{N2} A_{1 \leftarrow 2}^{CONV}}{N1 + N2}$$

wherein:

N1 and N2 are the number of acquisitions for the detectors of the first instrumentation system and of the second instrumentation system, respectively;

$(A_1^{MES})_{relatif}$ is the distribution of the activities is measured by the detectors of the first instrumentation system, whose elements are linked by a normalization of series; and $A_{1 \leftarrow 2}^{CONV}$ is the conversion of an activity is measured by a detector of the second instrumentation system into an activity that would be detected by a detector of the first instrumentation system.

15. The method according to claim 13, wherein the reference instrumentation system is a mobile detector system.

16. The method according to claim 13, wherein the second reference instrumentation system is a fixed detector system.

17. The method according to claim 13, wherein the reference instrumentation system is a RIC-type system.

18. The method according to claim 13, wherein the second instrumentation system initiates collectron-type detectors.

* * * * *